US006236546B1

(12) United States Patent
Blickhan et al.

(10) Patent No.: US 6,236,546 B1
(45) Date of Patent: May 22, 2001

(54) CROWBAR CIRCUIT VERIFICATION TESTING SYSTEM

(75) Inventors: Joseph David Blickhan; James Bruce Pickard, both of Quincy, IL (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 09/374,684

(22) Filed: Aug. 16, 1999

(51) Int. Cl.[7] ....................................................... H02H 9/00
(52) U.S. Cl. .............................. 361/54; 361/57; 361/104; 324/424
(58) Field of Search ............................ 361/54, 57, 104; 324/424

(56) References Cited

U.S. PATENT DOCUMENTS

| 4,156,264 | 5/1979 | Hoover | 361/56 |
| 4,864,286 | * 9/1989 | Ohshita et al. | 340/644 |
| 4,926,281 | * 5/1990 | Murphy | 361/55 |

FOREIGN PATENT DOCUMENTS

| 39 23 474 A1 | 1/1991 | (DE) . |
| 196 24 517 C1 | 11/1997 | (DE) . |

OTHER PUBLICATIONS

XP–000972519 Test Wire for High Voltage Power Supply Crowbar System, by Joseph T. Bradley III and Michael Collins, Los Alamos National Laboratory, LANSCE–5, M.S. H827, P.O. Box 1663, Los Alamos, NM 87545, John M. Gahl, University of New Mexico, Albuquerque, NM 87131, Mar. 1997.
PCT International Search Report.

* cited by examiner

Primary Examiner—Michael J. Sherry
(74) Attorney, Agent, or Firm—Tarolli, Sundheim, Covell, Tummino & Szabo L.L.P.

(57) ABSTRACT

A system is disclosed for verifying the operativeness of a crowbar circuit which normally protects an electrical device in a series circuit with a power supply. The crowbar circuit includes means for sensing fault current in the series circuit and a crowbar switch responds to the sensing means for protecting the electrical device by directing the fault current away from the electrical device. The system includes verification testing means including a fuse and actuatable pneumatic switch connected together in series for, when said pneumatic switch is actuated, providing a short circuit across the crowbar switch to verify the operativeness of the crowbar circuit which, if not operative, causes the fault current to flow through and blow out the fuse.

18 Claims, 2 Drawing Sheets

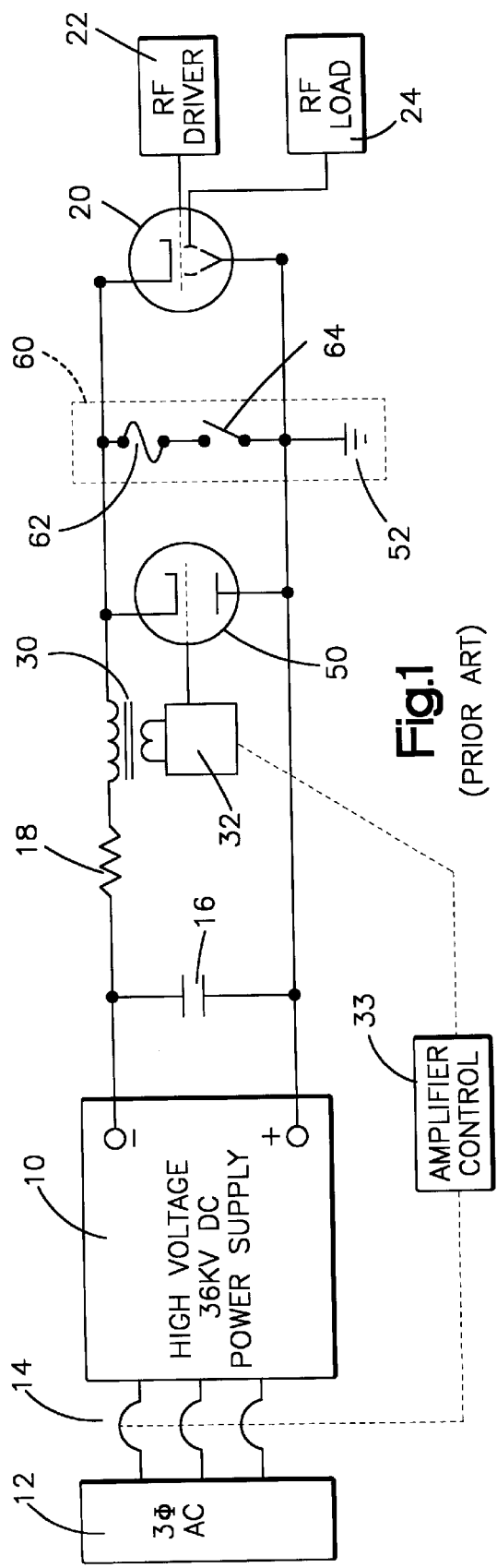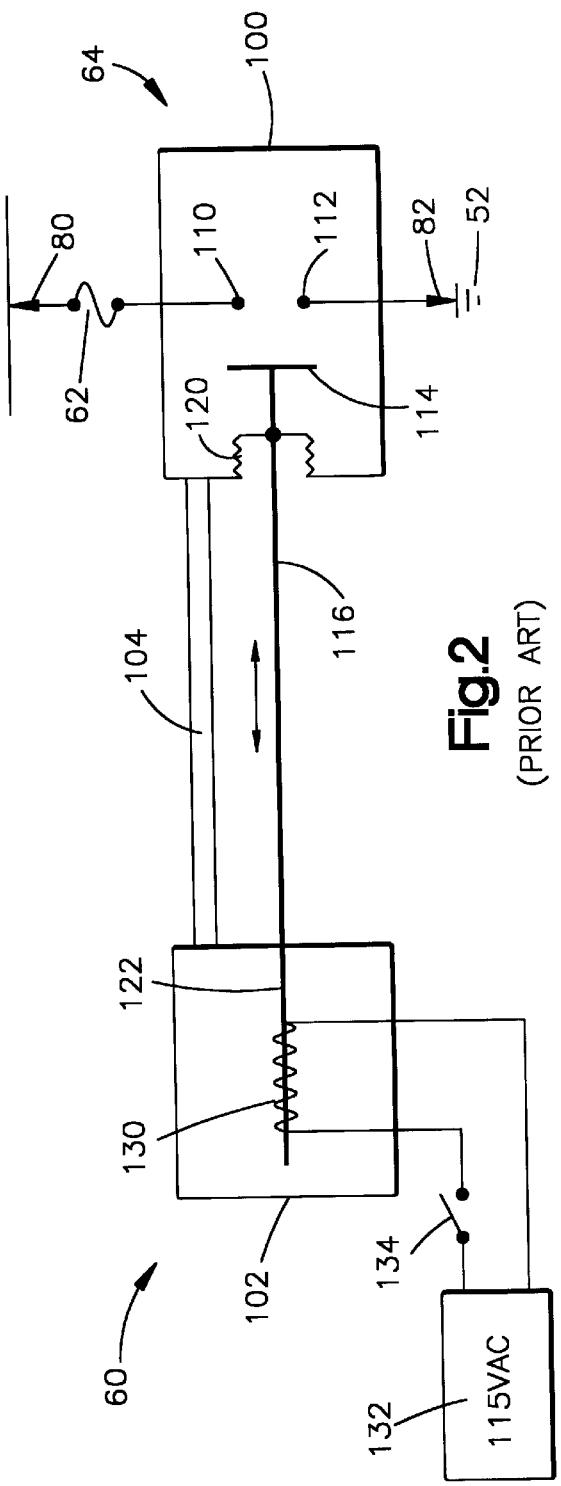
Fig.1 (PRIOR ART)
Fig.2 (PRIOR ART)

CROWBAR CIRCUIT VERIFICATION TESTING SYSTEM

FIELD OF THE INVENTION

The present invention relates to the art of crowbar circuits and, more particularly, to verification of the operativeness of such a circuit.

BACKGROUND OF THE INVENTION

Crowbar circuits are known in the art and are typically employed for protecting an electrical device from damage by high currents resulting from fault conditions. For example, an inductive output tube (IOT) is frequently employed in UHF television transmitters. Such an IOT is connected to a high voltage (HV) power supply and may suffer adverse damage from a sudden high current resulting from internal tube arcing. Under such conditions, an unprotected IOT will draw excessive current from the HV power supply causing possible damage to the tube.

A crowbar circuit serves to detect a sudden rise in current drawn from the HV supply due to fault conditions. This will cause an electronic switching device, such as a deuterium thyratron, to be turned on and it serves to direct the fault current from the supply away from the IOT to prevent damage. When the crowbar switching device, thyratron, is turned on it informs an amplifier controller and the controller causes a circuit breaker to open disconnecting the HV power supply from its AC line voltage source.

The thyratron is connected directly across the HV supply and, hence, when it is turned on it provides essentially a short circuit across the IOT. An electrode, such as the anode, of the thyratron is connected to earth ground. In order to determine whether the crowbar circuit is operative, a fuse wire may be connected between the cathode of the thyratron and a point that may be shorted to ground quickly.

A crowbar circuit verification device known in the prior art is illustrated in FIG. 1 and it includes a fuse wire together with a vacuum switch, which, when closed, provides a short circuit around the thyratron to direct fault current to ground. The fuse wire together with the vacuum switch are disclosed in detail in FIG. 2 which will be described in greater detail hereinbelow. This vacuum shorting switch of the prior art has several shortcomings including the fact that it requires an external power source to operate the switch. Additionally, this form of a shorting switch cannot normally be installed inside a typical HV compartment because it requires transmitter interlocks to be defeated. The shorting switch does not provide positive provision for connecting the fuse wire. The switch is bulky and difficult to transport and is relatively expensive.

SUMMARY OF THE INVENTION

It is an object of the present invention to provide means for verifying the operativeness of a crowbar circuit which does not require an external power source to operate the crowbar shorting switch.

In accordance with the present invention, a system is provided for verifying the operativeness of a crowbar circuit that normally protects an electrical device located in a series circuit with a power supply. The crowbar circuit includes means for sensing fault current in the series circuit and a crowbar switch that responds to the sensing means for protecting the electrical device by directing the fault current away from the electrical device. The system includes verification testing means having a fuse and actuatable pneumatic shorting switch connected together in series so that when the pneumatic switch is actuated it provides a short circuit across the crowbar shorting switch to verify the operativeness of the crowbar circuit which, if not operative, will cause the fault current to flow through and blow out the fuse.

BRIEF DESCRIPTION OF THE DRAWINGS

The foregoing and other objects and advantages of the invention will become more readily apparent from the following description of the preferred embodiment of the invention as taken in conjunction with the accompanying drawings, which are a part hereof, and wherein:

FIG. 1 is a schematic-block diagram illustration of a crowbar circuit including a prior art crowbar test fixture;

FIG. 2 is a schematic-block diagram of the crowbar test fixture of FIG. 1 in greater detail;

DESCRIPTION OF THE PREFERRED EMBODIMENT

Figure 5:
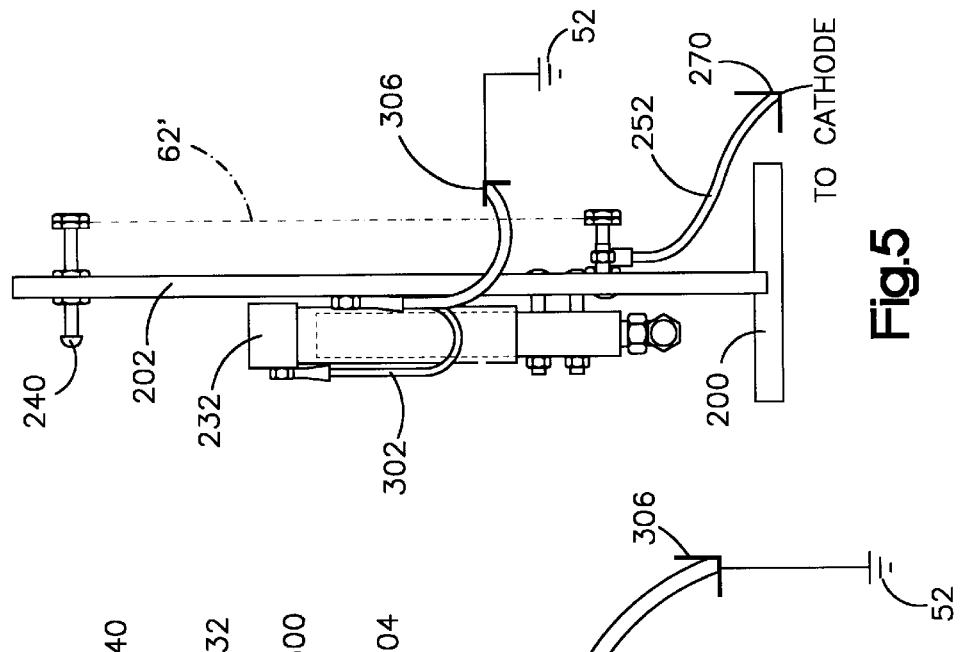
FIG. 5 is an end view looking generally along the line 5—5 in FIG. 4 looking in the direction of the arrows.

Before describing the preferred embodiment, reference is first made to the crowbar circuit illustrated in FIG. 1, followed by a description of the prior art vacuum shunting switch shown in FIG. 2.

Reference is now made to FIG. 1 which illustrates a crowbar circuit known in the art. This circuit includes a high voltage power supply 10 which may provide 36 kilovolts (kv) direct current from an AC three phase source 12 interconnected with the supply by means of a typical circuit breaker 14. An energy storage capacitor 16 is connected across the output of the power supply 10. A current limiting resistor 18 is connected in the series circuit with a device to be protected taking the form of an inductive output tube (IOT) which is used as an RF amplifier in a UHF transmitter. The IOT tube 20 may be driven from an RF driver source 22 for supplying power to an RF load 24. The current limiting resistor 18 is connected to the cathode circuit of the IOT 20. The crowbar circuit includes a current sensor taking the form of a current transformer 30 located in the series circuit for sensing the level of the current flowing therethrough. This transformer is coupled with a controller 32 that monitors the magnitude of the current sensed by the transformer 30 and if the current is sufficiently high, then it is deemed to be a fault current representative of fault in the series circuit. This fault may be an arcing taking place in the IOT 20 or an HV cable fault. The crowbar circuit serves upon detection of this condition to actuate a shunt switch which may take the form of a deuterium thyratron 50 having its anode connected to earth ground 52 and its cathode connected to the cathode of the IOT 20. Whenever the thyratron 50 is triggered on as result of sensed fault current, the fault current is diverted away from the IOT 20 and instead flows through the thyratron to earth ground.

Whenever the thyratron is turned on by the control circuit 32, the control circuit notifies an amplifier controller 33 that the thyratron has been turned on and the amplifier controller 33, in turn, opens the circuit breaker 14 to disconnect the power supply 10 from the AC voltage source 12.

In order to verify that the crowbar circuit is operative, the prior art is provided a verification circuit 60 which is connected between earth ground 52 and the cathode of the thyratron 50. This is a series circuit and includes a fuse 62 and a vacuum shunt switch 64. Closure of this shunt switch causes a short circuit across the thyratron. This results in a sudden increase in current flowing through the series circuit. This is sensed as a fault current by the current transformer 30 and the controller 32 attempts to turn on the thyratron 50. If the thyratron 50 does not turn on, then the fault current will flow through fuse 62 and cause the fuse to blow.

Reference is now made to FIG. 2 which illustrates the prior art verification testing circuit 60 in greater detail. Circuit 60 includes a fuse 62 and a vacuum enclosed switch 64 connected together in series. The series circuit has clip connectors 80 and 82 at either end which may be used to clip the circuit between circuit ground 52 and the cathode of tubes 20 and 50. The vacuum switch 64 takes the form of a vacuum enclosed high voltage direct current contactor which may obtained from Jennings Corporation of San Jose, Calif. and known as their model No. RP101F. This device may be represented as shown in FIG. 2 and includes a sealed vacuum enclosure 100 connected to a closed actuator housing 102 by means of an insulated support post structure 104. The vacuum enclosure 100 serves as a housing for a pair of spaced stationary electrical contacts 110 and 112 together with a movable contact 114 which, when actuated, completes a short circuit between stationary contacts 110 and 112. The movable contact 114 is connected by a drive post 116 to a vacuum sealed bellows arrangement 120 and, thence, to the actuator housing 102. The drive post 116 may be of insulated material such as plastic, although the contact 114 is of electrically conductive material. The drive post 116 is of magnetic material for its portion 122 within the actuator housing 102.

The housing 102 includes a solenoid coil 130 which surrounds the magnetic portion of the length of the drive post within the actuator housing and a pair of wires that extend out through the housing to a 115 volt AC voltage supply source 132 for actuating the coil 130 upon closure of a switch 134.

Closure of the switch 134 by an operator causes the drive post 116 to drive the movable contact 114 into engagement with the stationary contacts 110 and 112 to complete a short circuit with the fuse 62 across the anode to cathode circuit of the thyratron 50.

The shortcomings of the prior art crowbar verification circuit of FIG. 2 include the required external power source 132 and electrical switch 134 in order to operate the vacuum switch. Also, the switch has problems when installed inside an HV compartment because the required transmitter interlocks are defeated. Also there is no positive provision for connecting the fuse 62.

Figure 4:
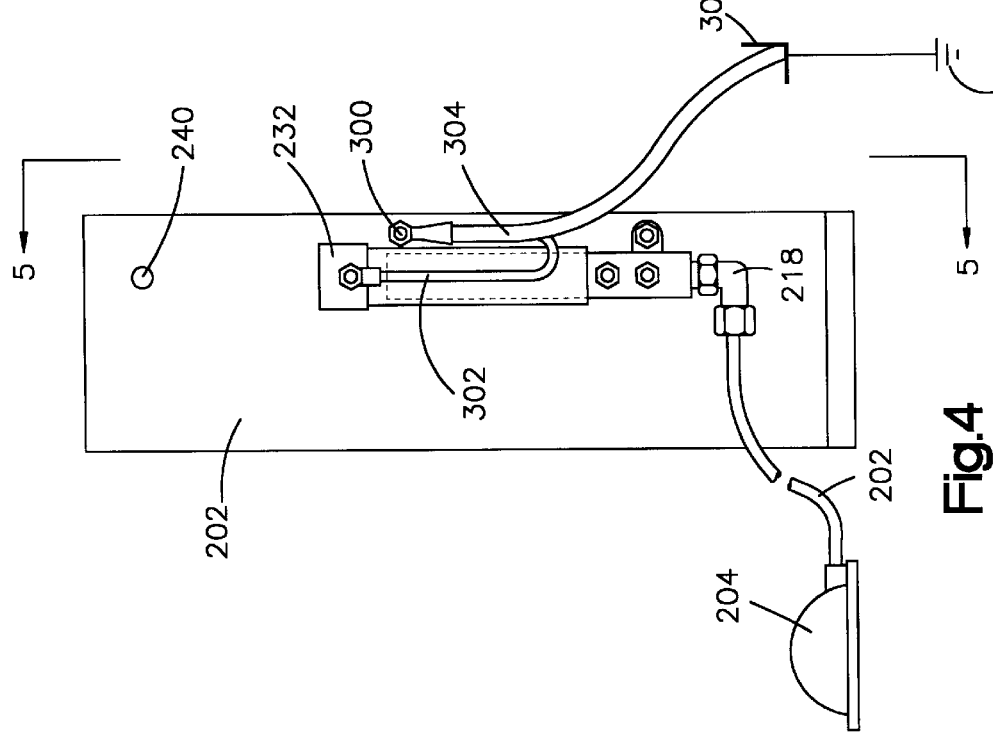
FIG. 4 is an elevational view taken generally along line 4—4 looking in the direction of the arrows in FIG. 3.
Figure 3:
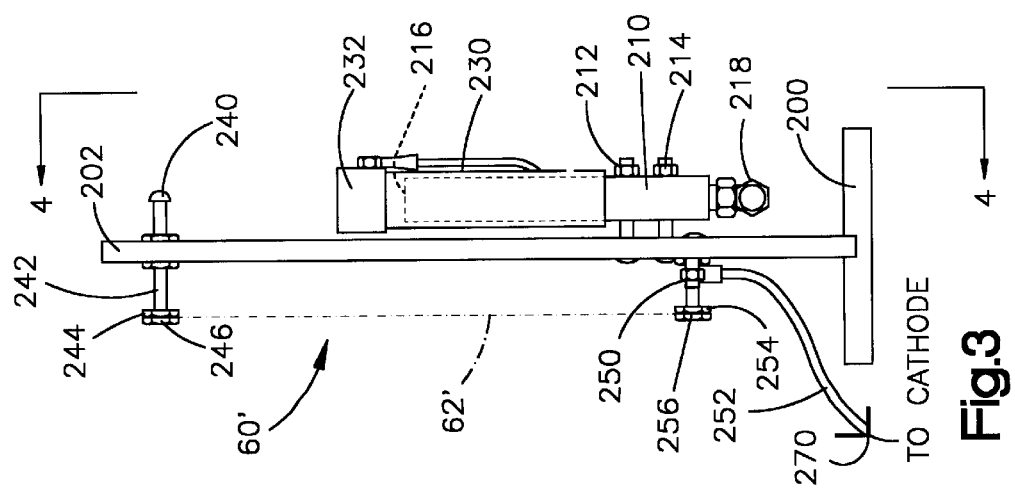
FIG. 3 is an end view illustrating one embodiment of the present invention.

The present invention is directed toward improvements over that of FIG. 2. The crowbar test fixture as shown in FIGS. 3, 4 and 5 herein is constructed primarily of non-conductive materials and the operation of the switch is pneumatic and therefore the fixture requires no external power source or conductor wiring outside of the transmitter cabinet. As will be noted, a pulse of air is supplied by manually actuating a foot-pedal type air pump. This pulse of air travels through non-conductive hose and tubing to a cylinder-piston assembly. The piston has electrically conductive contact surface that is connected by way of a high voltage wire to earth ground. The air pulse causes the piston to quickly rise and make engagement with a stationary contact on the fixture. The stationary contact is connected to one end of the fuse wire. The other end of the fuse wire is connected to a lower fuse wire terminal and, in turn, is connected to the cathode of the thyratron 50. This fixture is constructed such that it can be placed inside a high voltage compartment. Voltage standoffs are such that the fixture can safely be set onto a grounded or a high voltage surface. The tubing is of sufficient length and dielectric resistance to allow the foot pedal to be placed safely outside the high voltage compartment. The diameter of the tubing is relatively small and this makes it possible to close safety panels and take full advantage of all safety interlocks during the test.

Reference is now specifically made to FIGS. 3, 4 and 5 which illustrate the preferred embodiment of the crowbar test fixture in accordance with the present invention. This crowbar test fixture 60 includes a pneumatically operated switch and a fuse in a series circuit that schematically takes the form as illustrated with reference to the fixture 60 in FIG. 1. However, fixture 601 differs substantially from fixture 60 in FIG. 2.

The crowbar test fixture construction in accordance with the preferred embodiment of the present invention includes a horizontal support 200 and a vertically extending mounting panel 202 suitably secured to the support 200. Support 200 and panel 202 are preferably constructed of non-conductive materials, such as plastic or glass. A hollow plastic tube 210 is mounted to the mounting panel 202 by means of a pair of suitable nut and bolt assemblies 212 and 214. The upper end 216 of tube 210 is open and the lower end is connected to a suitable fitting 218 which, in turn, is connected by way of a hose 202 to a foot operated air pump 204.

A second hollow plastic tube, hereinafter referred to as piston 230, coaxially surrounds tube 210 and has an inner diameter which is somewhat greater than that of the outer diameter of tube 210. The upper end of piston 230 carries a cap 232 which is made of copper or another suitable electrically conductive material. The cap 232 serves as a movable electrical contact during operation. Spaced upwardly from cap 232 there is provided a stationary electrical contact 240 which may take the form of a suitable bolt 242 or the like which is mounted to and extends through the panel 202 and held in place with suitable nuts on both sides of the panel. The bolt 242 defining the upper contact 240 extends through the panel and the opposite end thereof (the left end in FIG. 3) is provided with a nut 244 and another nut 246.

At the lower end of mounting panel 202 a bolt 250 extends through the panel and one end of an electrical cable 252 is electrically and mechanically connected to the bolt 250 by suitable nuts. The distal end of this bolt (as viewed in FIG. 3) carries a nut 254 and another nut 256. The fuse wire 621 is mounted to the bolts 242 and 250 by backing away the nuts 246 and 256 from the nuts 244 and 254. At least one turn of the wire is wrapped around each of the bolts 242 and 250 and then the nuts are tightened to secure the fuse wire in place.

The unfastened end of the electrical cable 252 is provided with a suitable electrical clip 270 which is used to connect the end of the cable to the cathode side of the crowbar circuit of FIG. 1.

The copper cap 232 is electrically connected to a terminal post 300 by means of a flexible length of cable 302 of sufficient length to accommodate the movement of the cap 232 between its lowermost position, as shown in the drawings, and its uppermost position when it engages stationary contact 240. An electrical cable 304 is connected from the terminal 300 to ground, as with the use of a suitable electrical clip 306.

The operative parts of the test fixture may be enclosed in a transparent plastic housing. During assembly the fuse wire may take the form of a 36 gauge wire having a length on the order of 11.8 inches.

During the verification test of the crowbar circuit, it may be desirable to disconnect the IOT 20. It is suggested that the crowbar circuit be tested whenever a new IOT tube is to be installed and thereafter on an annual basis or when in doubt of proper crowbar circuit operation.

Although the invention has been described in conjunction with a preferred embodiment, it is to be appreciated that various modifications may be made without departing from the spirit and scope of the invention as defined by the appended claims.

Having described the invention, we claim:

1. A system for verifying the operativeness of a crowbar circuit which normally protects an electrical device in a series circuit with a power supply, and wherein said crowbar circuit includes means for sensing fault current in said series circuit and a crowbar switching means responsive to said sensing means for protecting said electrical device by directing said fault current away from said electrical device, said system comprising:
   verification testing means including a fuse and actuatable pneumatic switch means connected together in series for, when said switch means is actuated, providing a short circuit across said crowbar switching means to verify the operativeness of said crowbar circuit which, if not operative, causes said fault current to flow through and blow out said fuse.

2. A system as set forth in claim 1, wherein said pneumatic switch means includes a stationary contact and a movable contact normally spaced from said stationary contact and means to provide a burst of pressurized air in such a manner to cause said movable contact to be displaced toward and make at least temporary engagement with said stationary contact for a time period sufficient for said fault current to flow through and blow out said fuse.

3. A system as set forth in claim 2 including a hollow piston having a cap on one end thereof and an open end at the other end thereof, said cap carrying said movable contact.

4. A system as set forth in claim 3 including means for directing said air into the open end of said piston to drive said piston toward said stationary contact.

5. A system as set forth in claim 4 wherein said means to direct further includes a stationary hollow tube having one end extending into the open end of said piston and an air inlet at the other end thereof.

6. A system as set forth in claim 5 including means for directing a burst of air into said air inlet.

7. A system as set forth in claim 6 wherein said means for providing said burst of air includes an actuatable air pump.

8. A system as set forth in claim 7 wherein said air pump is manually actuatable.

9. A system as set forth in claim 6 wherein said actuatable air pump has a foot pedal actuatable by a human foot.

10. A method for verifying the operativeness of a crowbar circuit used for protecting an electrical device located in a series circuit with a power supply and wherein the crowbar circuit employs means for sensing fault current in the series circuit and a crowbar switch responsive to the sensing means for protecting the electrical device by directing fault current away from the electrical device wherein the method comprises the steps of:
    connecting a fuse and an actuatable pneumatic switch together in a series circuit and then actuating said pneumatic switch for providing a short circuit across the crowbar switch to thereby verify the operativeness of the crowbar circuit which, if not operative, will cause the fault current to flow through and blow out the fuse.

11. A system for verifying the operativeness of a crowbar circuit which normally protects an electrical device in a series circuit with a power supply, and wherein said crowbar circuit includes a sensor that senses fault current in said series circuit and a crowbar switch that responds to said sensor for protecting said electrical device by directing said fault current away from said electrical device, said system comprising:
    verification tester including a fuse and an actuatable pneumatic switch connected together in series for, when said pneumatic switch is actuated, providing a short circuit across said crowbar switch to verify the operativeness of said crowbar circuit which, if not operative, causes said fault current to flow through and blow out said fuse.

12. A system as set forth in claim 11, wherein said pneumatic switch includes a stationary contact and a movable contact normally spaced from said stationary contact and a pressurized air delivery device that provides a burst of pressurized air in such a manner to cause said movable contact to be displaced toward and make at least temporary engagement with said stationary contact for a time period sufficient for said fault current to flow through and blow out said fuse.

13. A system as set forth in claim 12 including a hollow piston having a cap on one end thereof and an open end at the other end thereof, said cap carrying said movable contact.

14. A system as set forth in claim 13 including an air director that directs said pressurized air into the open end of said piston to drive said piston toward said stationary contact.

15. A system as set forth in claim 14 wherein said air director includes a stationary hollow tube having one end extending into the open end of said piston and an air inlet at the other end thereof.

16. A system as set forth in claim 12 wherein said air delivery device includes an actuatable air pump.

17. A system as set forth in claim 16 wherein said air pump is manually actuatable.

18. A system as set forth in claim 16 wherein said actuatable air pump has a foot pedal actuatable by a human foot.

* * * * *